United States Patent
Ferguson

(10) Patent No.: US 6,941,017 B2
(45) Date of Patent: Sep. 6, 2005

(54) TEMPORAL PROCESSING FOR REALTIME HUMAN VISION SYSTEM BEHAVIOR MODELING

(75) Inventor: Kevin M. Ferguson, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 569 days.

(21) Appl. No.: 09/955,614

(22) Filed: Sep. 18, 2001

(65) Prior Publication Data

US 2003/0053698 A1 Mar. 20, 2003

(51) Int. Cl.$^7$ .................................................. G06K 9/76
(52) U.S. Cl. ........................ 382/210; 348/189; 348/192; 382/156; 382/239; 382/260; 382/286
(58) Field of Search .............................. 348/180, 189, 348/192, 665, 667, 835; 382/156, 239, 260, 286, 209, 210, 261, 262, 263, 264, 265; 345/598, 599; 359/559

(56) References Cited

U.S. PATENT DOCUMENTS

| | | | |
|---|---|---|---|
| 4,907,069 A | * 3/1990 | Bretl | 348/389.1 |
| 5,049,993 A | * 9/1991 | LeGall et al. | 348/448 |
| 5,134,667 A | * 7/1992 | Suzuki | 382/164 |
| 5,446,492 A |   8/1995 | Wolf et al. | |
| 5,719,966 A |   2/1998 | Brill et al. | |
| 5,790,717 A |   8/1998 | Judd | |
| 5,820,545 A | * 10/1998 | Arbter et al. | 600/117 |
| 5,974,159 A |   10/1999 | Lubin et al. | |
| 6,119,083 A | * 9/2000 | Hollier et al. | 704/243 |
| 6,278,735 B1 | * 8/2001 | Mohsenian | 375/240 |
| 6,408,103 B1 | * 6/2002 | Gallagher et al. | 382/260 |
| 6,654,504 B2 | * 11/2003 | Lubin et al. | 382/254 |
| 6,678,424 B1 | * 1/2004 | Ferguson | 382/286 |
| 6,690,839 B1 | * 2/2004 | Ferguson | 382/274 |

FOREIGN PATENT DOCUMENTS

WO    WO 99 43161    8/1999

* cited by examiner

*Primary Examiner*—Bhavesh M. Mehta
*Assistant Examiner*—Gregory Desire
(74) *Attorney, Agent, or Firm*—Francis I. Gray

(57) ABSTRACT

Temporal processing for realtime human vision system behavioral modeling is added at the input of a spatial realtime human vision system behavioral modeling algorithm. The temporal processing includes a linear and a non-linear temporal filter in series in each of a reference channel and a test channel, the input to the reference channel being a reference image signal and the input to the test channel being a test image signal that is an impaired version of the reference image signal. The non-linear temporal filter emulates a process with neural attack and decay to compensate for a shift in peak sensitivity and for frequency doubling in a spatio-temporal sensitivity function. The linear temporal filter accounts for the remaining subtleties in the spatio-temporal sensitivity function.

7 Claims, 2 Drawing Sheets ary peak in the spatio-temporal response, where the spatial frequency sensitivity (and associated contrast sensitivity versus frequency—CSF) curve is roughly translated down an octave from that at 0 Hertz.
TEMPORAL PROCESSING FOR REALTIME HUMAN VISION SYSTEM BEHAVIOR MODELING

STATEMENT REGARDING FEDERALLY SPONSORED RESEARCH OR DEVELOPMENT

The Government may have certain rights under this invention as specified in Department of the Air Force contract F30602-98-C-0218.

BACKGROUND OF THE INVENTION

The present invention relates to video picture quality assessment, and more particularly to temporal processing for realtime human vision system behavior modeling.

In general the stimuli that have been used to explore the human vision system (HVS) may be described using the following parameters: temporal frequency; spatial frequency; average luminance or lateral masking effects; angular extent or size of target image on retina; eccentricity or angular distance from the center of vision (fovea); equivalent eye motion; rotational orientation; and surround. Furthermore many of the stimuli may be classified into one of the following categories: standing waves; traveling waves; temporal pulses and steps; combinations of the above (rotational, both of target image pattern and masker); and "natural" scene/sequences. The responses to these stimuli have been parameterized as: threshold of perception as in discrimination; suprathreshold temporal contrast perception; perceived spatial frequency including frequency aliasing/doubling; perceived temporal frequency including flickering, etc.; perceived velocity (speed and direction); perceived phantom signals (noise, residual images, extra/missing pulses, etc.); perceived image quality; and neural response (voltage waveforms, etc.).

The problem is to create a method for reproducing and predicting human responses given the corresponding set of stimuli. The ultimate goal is to predict image quality. It is assumed that to achieve this, at a minimum the threshold and suprathreshold responses should be mimicked as closely as possible. In addition the prediction of visual illusions, such as spatial frequency doubling or those related to seeing additional (phantom) pulses, etc. is desired, but this is considered to be of secondary importance. Finally the predictions should be consistent with neural and other intermediate responses.

The HVS models in the literature either do not account for temporal response, do not take into account fundamental aspects (such as the bimodal spatio-temporal threshold surface for standing waves, masking, spatial frequency doubling, etc.), and/or are too computationally complex or inefficient for most practical applications.

U.S. Pat. No. 6,678,424, issued Jan. 13, 2004 to the present inventor and entitled "Real Time Human Vision System Behavioral Modeling", provides an HVS behavioral modeling algorithm that is spatial in nature and is simple enough to be performed in a realtime video environment. Reference and test image signals are processed in separate channels. Each signal is spatially lowpass filtered, segmented into correponding regions, and then has the region means subtracted from the filtered signals. Then after injection of noise the two processed image signals are subtracted from each other and per segment variances are determined from which a video picture quality metric is determined. However this modeling does not consider temporal effects.

Neural responses generally have fast attack and slow decay, and there is evidence that some retinal ganglion cells respond to positive temporal pulses, some to negative, and some to both. In each case if the attack is faster than decay, temporal frequency dependent rectification occurs. Above a critical temporal frequency at which rectification becomes dominant, spatial frequency doubling takes place. This critical temporal frequency happens to correspond to a second- What is desired is an algorithm for realtime HVS behavior modeling that improves the efficiency and accuracy for predicting the temporal response of the HVS.

BRIEF SUMMARY OF THE INVENTION

Accordingly the present invention provides a temporal processing algorithm for realtime human vision system behavioral modeling that is added prior to a spatial processing algorithm for improved prediction of the temporal response of the HVS behavioral modeling. The temporal processing includes a linear and a non-linear temporal filter in series in each of a reference channel and a test channel, the input to the reference channel being a reference image signal and the input to the test channel being a test image signal that is an impaired version of the reference image signal. The non-linear temporal filter emulates a process with neural attack and decay to account for a shift in peak sensitivity and for frequency doubling in a spatio-temporal sensitivity function. The linear temporal filter accounts for the remaining subtleties in the spatio-temporal sensitivity function.

The objects, advantages and other novel features of the present invention are apparent from the following detailed description when read in conjunction with the appended claims and attached drawing figures.

DETAILED DESCRIPTION OF THE INVENTION

Figure 1:
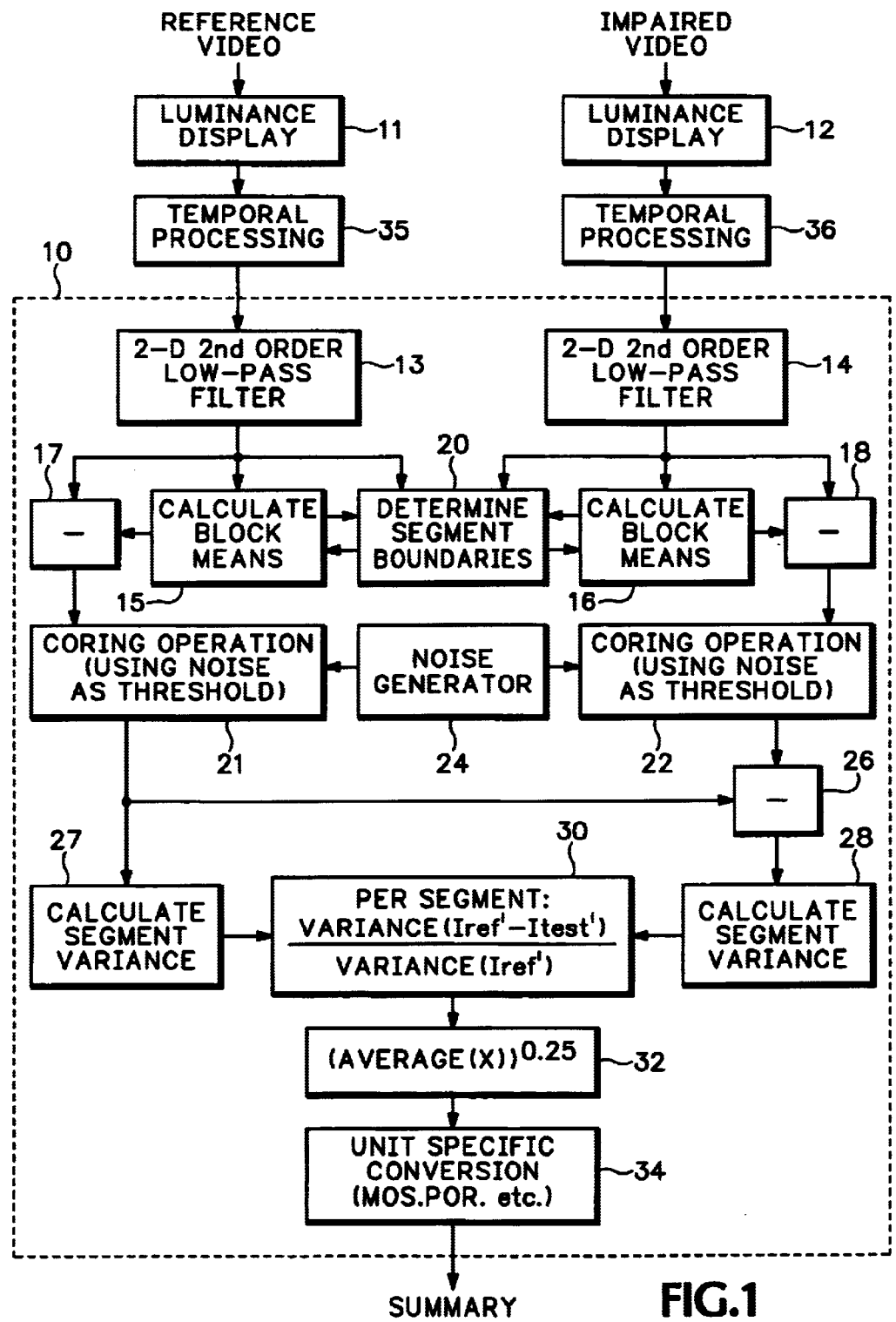
FIG. 1 is a block diagram view of an efficient predictor of subjective video quality rating measures according to the present invention.

Referring now to FIG. 1 a flow chart for a picture quality assessment apparatus is shown similar to that described in the above-identified co-pending application. A reference image signal and an impaired (test) image signal are input to respective display models 11, 12 for conversion into luminance units. The luminance data is input to a spatial modeling algorithm 10, which is implemented as respective two-dimensional low-pass filters 13, 14 and one implicit high pass filter (local mean (low pass) from step 15, 16 is subtracted in step 17, 18 respectively from each individual pixel). This filter combination satisfies the requirements suggested by the data (Contrast Sensitivity versus Frequency) in the literature for each orientation, average luminance and segment area. There is only one image output from this stage to be processed by subsequent stages for each image, as opposed to a multiplicity of images output from filter banks in the prior art.

Block means are calculated 15, 16, such as for three pixels by three pixels blocks. In both channels the image is segmented 20 based on block average mean and other simple block statistics. However for simplification and reduction of computation resources the step 20 may be omitted. Block statistics used in the current segmentation algorithm include local (block) means luminance and previous variance. However simple max and min values may be used for region growing. Each block means is averaged over the segment to which it belongs to create new block means. These means are subtracted 17, 18 from each pixel in the respective blocks completing the implicit high pass filter.

Noise from a noise generator 24 is injected at each pixel via a coring operation 21, 22 by choosing the greater between the absolute value of the filtered input image and the absolute value of a spatially fixed pattern of noise, where:

$$Core(A,B)=\{(|A|-|B|) \text{ for } |A|>|B|; 0 \text{ for } |A|<|B|\}*sign (A)$$

where A is the signal and B is the noise. Segment variance is calculated 27, 28 for the reference image segments and for a difference 26 between the reference and test image segments. The two channel segment variance data sets are combined 30 for each segment by normalizing (dividing) the difference channel variance by the reference variance.

Finally the Nth root of the average of each segment's normalized variance is calculated 32 to form an aggregate measure. Again for this example N=4, where N may be any integer value. The aggregate measure may be scaled or otherwise converted 34 to appropriate units, such as JND, MOS, etc.

Figure 2:
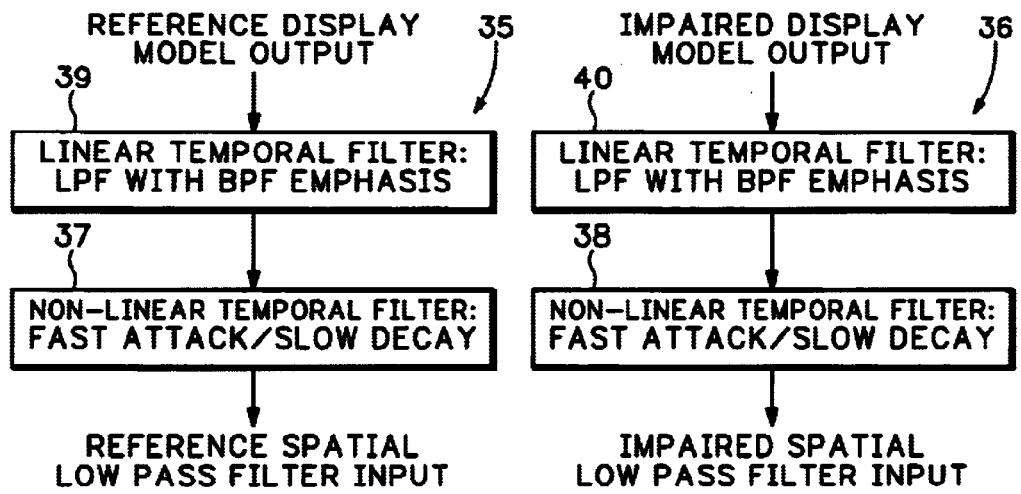
FIG. 2 is a block diagram view of the temporal processing portion of the predictor of FIG. 1 according to the present invention.

An additional step is added in each channel before input to the spatial modeling algorithm 10—temporal processing 35, 36. The facts discussed above in the Background with respect to neural responses suggest that the same mechanism for frequency doubling may also account for the spatio-temporal frequency coordinates of the secondary peak of a spatio-temporal sensitivity surface. Providing the temporal process 35, 36 with neural attack and decay before the spatial processing emulates both the shift in peak sensitivity (spatial frequency location of peak as a function of temporal frequency) and the frequency doubling aspects. This may be realized with a non-linear temporal filter 37, 38 as shown in FIG. 2. Then a linear temporal filter 39, 40 accounts for the remaining subtleties in the spatio-temporal sensitivity function. This combination of linear and non-linear filters also accounts for the thresholds of detection of: pulses as a function of amplitude and duration; impairments as a function of amplitude and temporal proximity to scene changes; and flicker and fusion frequency as a function of modulation amplitude.

Figure 3:
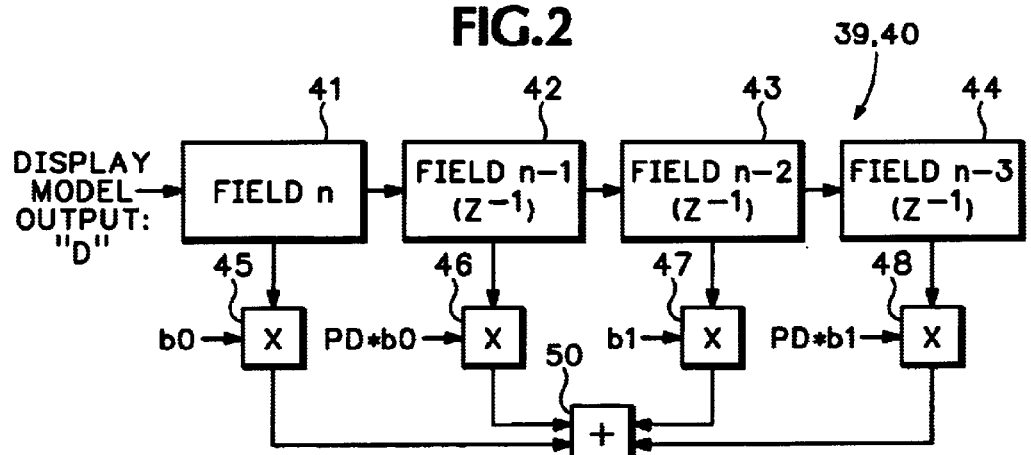
FIG. 3 is a block diagram view of a linear temporal filter for the temporal processing portion of FIG. 2 according to the present invention.

The linear temporal filter 39, 40 shown in FIG. 3 has the characteristics of the combination of low-pass and bandpass filters. The luminance data is input to a series of field delay modules 41–44 with a tap at each field. The tap outputs are input to respective multipliers 45–48 where they are weighted by respective coefficients b0, $D_{ec}*b0$, b1, $D_{ec}*b1$ and summed in a summation circuit 50. Essentially the linear temporal filter 39, 40 is the weighted difference between frames, with each frame having the appropriate decay ($D_{ec}$) for the older of the two fields. For each pixel at spatial location (x,y), the filter output LTF[field] given filter inputs D[ ] is given by:

$$LTF[\text{field}]=(D[\text{field}]+D[\text{field-1}]*D_{ec})*b0+(D[\text{field-2}]+D[\text{field-3}])*D_{ec})*b1$$

where: field=field number in sequence; LTF[field]=linear filter output at a particular pixel (LTF[x,y,field]); D[field]= input pixel from the luminance data at this particular (x,y, field) coordinate; b0, b1=FIR filter coefficients (b0=1; b1=− 0.5, for example); and $D_{ec}$=decay. The b0 coefficient is nominally 1 and the b1 coefficient controls the amount of boost at about 8 Hz. The b1 parameter is calibrated after the non-linear temporal filter 37, 38 is calibrated. $D_{ec}$ is nominally 1 or less, depending on the sample rate.

Figure 4:
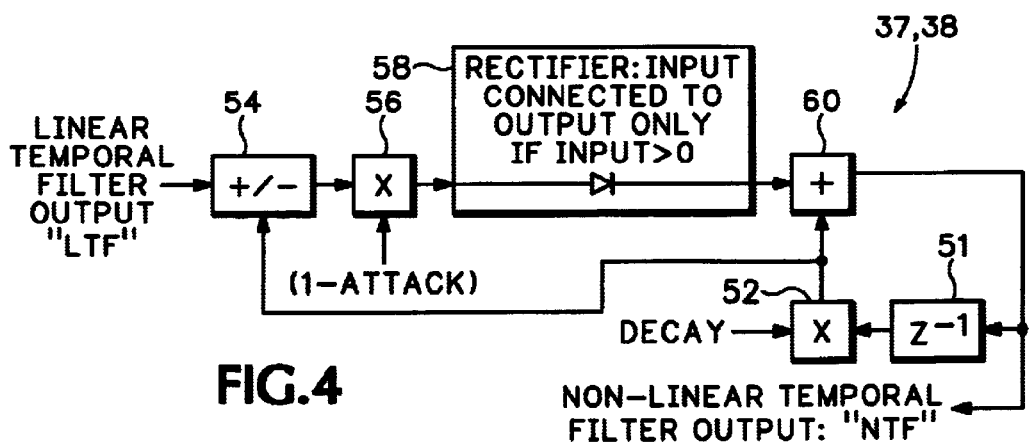
FIG. 4 is a block diagram view of a non-linear temporal filter for the temporal processing portion of FIG. 2 according to the present invention.

The non-linear temporal filter 37, 38 shown in FIG. 4 has the characteristics of an envelope follower or amplitude modulation (AM) detector/demodulator. It has a faster attack than decay.

$$NTF[\text{field}] = \begin{array}{l} decay*NTF[\text{field-1}]; \text{ if } LTF[\text{field}] < decay*NTF[\text{field-1}] \\ (1-attack)*LTF[\text{field}] + decay*NTF[\text{field-1}]*attack; \end{array}$$

otherwise where: NTF[field]=non-linear filter output at a particular pixel (NTF[x,y,field]); attack=0.9 (higher attack coefficient corresponds to slower initial response); and decay–0.98 (higher decay coefficient corresponds to slower recovery). The output of the non-linear temporal filter 37, 39 is input to a delay 51 and subsequently multiplied by the decay in a first multiplier 52. The decayed output is then compared with the output from the linear temporal filter 39, 40 in a comparator 54. The result of the comparison is multiplied by (1-attack) in a second multiplier 56 and input to a rectifier 58. The output of the rectifier 58 is combined in a summation circuit 60 to produce the filter output. The attack and decay times are determined by calibrating the HVS model to both the spatio-temporal threshold surface and the corresponding supra-threshold regions of the spatial frequency doubling illusion. The non-linear temporal filter 37, 38 is responsible for the majority of the temporal masking and temporal related visual illusions.

The particular implementation shown is more responsive to positive transitions than to negative, which does not fully take into account the response to negative transitions or the retinal ganglion cells which supposedly respond equally to both. An improvement in accuracy may be made by including these responses at pseudo-random locations corresponding to the proposed theoretical distribution of photoreceptor types. Only the rectifier 58 needs to change, either in polarity or by including both with absolute value (full wave rectification). Spatially distributing the full wave rectification temporal processor at pixel locations chosen by a 10×10 pixel grid, with pseudo-random displacement of no more than a few pixels, accounts for a variety of visual illusions, including motion reversal and scintillating noise. However the extra processing required may not be desired for some applications.

Thus the present invention provides temporal processing for realtime HVS behavior modeling by inserting before spatial processing a two stage temporal filter—a linear temporal filter followed by a non-linear temporal filter—to emulate neural attack and decay.

What is claimed is:

1. An improved method of realtime human vision system behavior modeling of the type having spatial modeling to obtain a measure of visible impairment of a test image signal derived from a reference image signal comprising the step of temporally processing the reference and test image signals prior to the spatial modeling to account for a shift in peak sensitivity and for frequency doubling and other subtleties in a spatio-temporal sensitivity function by emulating neural attack and decay.

2. The improved method as recited in claim 1 wherein the processing step comprises the steps of:

linear temporal filtering the reference and test image signals to produce reference and test lowpass filter outputs to account for the subtleties in the spatio-temporal sensitivity function; and non-linear temporal filtering the reference and test lowpass filter outputs to produce reference and test non-linear filter outputs to account for the shift in peak sensitivity and for frequency doubling in the spatio-temporal sensitivity function, the reference and test non-linear filter outputs being input to the spatial modeling step to produce the measure of visible impairment.

3. The improved method as recited in claim 2 wherein the linear temporal filtering comprises characteristics of a combination of low-pass and bandpass filtering.

4. The improved method as recited in claim 2 wherein the linear temporal filtering comprises the steps of:

inputting the reference and test image signals to a series of field delay modules with a tap at each field;

coupling outputs from the taps to respective multipliers for weighting by respective coefficients; and summing outputs from the respective multipliers to produce the reference and test lowpass filter outputs which are the weighted difference between frames of the reference and test image signals with each frame having an appropriate decay for the older of the two fields that makeup each frame.

5. The improved method as recited in any of claims 2–4 wherein the non-linear temporal filtering comprises characteristics of an envelope follower having a faster attack than decay.

6. The improved method as recited in any of claims 2–4 wherein the non-linear temporal filtering comprises the steps of:

comparing the reference and test lowpass filter outputs with respective decayed versions of the reference and test non-linear filter outputs to produce respective comparison outputs;

multiplying the respective comparison outputs by an attack function to produce respective attack outputs;

rectifying the respective attach outputs to produce respective rectified outputs; and summing the respective rectified outputs with the respective decayed versions to produce the reference and test non-linear filter outputs which accounts for the majority of temporal masking and temporal related visual illusions.

7. The improved method as recited in claim 6 wherein the non-linear temporal filtering further comprises the step of determining the attack function and a decay function for the decayed versions by calibrating realtime human vision system behavior modeling to both a spatio-temporal threshold surface and corresponding supra-threshold regions of a spatial frequency doubling illusion.

* * * * *